UNITED STATES PATENT OFFICE 2,575,614

PREPARATION OF AMINOBENZOTHIAZOLE

Jack T. Cassaday and Erick I. Hoegberg, Stamford, Conn., assignors to American Cyanamid Company, New York, N. Y., a corporation of Maine No Drawing. Application October 7, 1950,
Serial No. 189,058

2 Claims. (Cl. 260—305)

The present invention relates to the reaction of 2-aminobenzenethiol with cyanogen chloride to give aminobenzothiazole.

It has been found that when o-aminobenzenethiol is reacted with cyanogen chloride a good yield of aminobenzothiazole is obtained. The reaction is a simple one and contemplates adding cyanogen chloride preferably as a gas into o-aminobenzenethiol, preferably dissolved in an inert solvent, until the gain in weight is approximately theoretical, in accordance with the following equation:

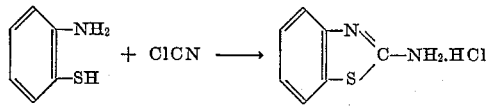

During the reaction, which is exothermic, the desired product precipitates. If desired, the reaction mass may be permitted to stand for a short time to complete the reaction. The thus-formed hydrochloride salt of aminobenzothiazole is then recovered, and it can be neutralized with alkali to provide free aminobenzothiazole.

There is nothing critical about the ratio of reactants, nor in the order of their mixing. However, it is obviously preferred to use the theoretical amounts in order to avoid wastage of reactants. Some of the desired product is, of course, formed almost immediately upon the introduction of a small amount of either reactant into a large amount of the other reactant, but it is preferred to complete the reaction by using stoichiometric amounts of both reactants.

Any inert solvent can be employed for the reaction, or aminobenzenethiol itself can be used as a solvent. Among such inert solvents are the following: methanol, ethanol, n-propanol, isopropanol, n-butanol, benzene, toluene, xylene, carbon tetrachloride, and ether. While the reaction is most conveniently conducted at room temperature, any temperature within the range of 0° C. up to the boiling point of the solvent selected can be used. When aminobenzenethiol is itself the solvent, the reaction temperature must of course be in excess of its freezing point, i. e., above 23° C.

The following example illustrates without limiting the invention.

*Example*

To 5.0 g. of o-aminobenzenethiol in 10.0 g. of isopropanol was added gaseous ClCN until the gain in weight was 2.5 g. A white solid precipitated and heat was evolved. After standing for 30 minutes the solid was filtered and washed with isopropanol. After air drying, the solid aminobenzothiazole hydrochloride weighed 6.2 g. and melted at 236°–240° C.

To 200 g. of water and 1.2 g. of NaOH was added 5.0 g. of this hydrochloride. The mixture was heated to 80° C., filtered, and cooled to crystallize aminobenzothiazole, which was filtered and dried over $H_2SO_4$. Yield 1.75 g. melting at 129°–131° C.

|  | Per Cent C | Per Cent H | Per Cent N |
|---|---|---|---|
| Calculated for $C_7H_6N_2S$ | 56.00 | 4.00 | 18.67 |
| Found | 56.16 | 3.95 | 18.37 |
|  | 56.38 |  | 18.67 |

While the invention has been described with particular reference to specific embodiments, it is to be understood that it is not to be limited thereto but is to be construed broadly and restricted solely by the scope of the appended claims.

We claim:

1. The method of preparing aminobenzothiazole hydrochloride that comprises subjecting o-aminobenzenethiol to the action of cyanogen chloride, and recovering the thus-formed aminobenzothiazole hydrochloride.

2. The method of preparing aminobenzothiazole hydrochloride that comprises subjecting o-aminobenzenethiol in an inert solvent to the action of cyanogen chloride until the gain in weight is approximately 50% based on the weight of o-aminobenzenethiol originally present, and recovering the thus-formed aminobenzothiazole hydrochloride.

JACK T. CASSADAY.
ERICK I. HOEGBERG.

No references cited.